US012735221B2

(12) United States Patent
Berg et al.

(10) Patent No.: US 12,735,221 B2
(45) Date of Patent: Sep. 15, 2026

(54) DEVICE AND METHOD FOR REFILLING AND TRANSFERRING SOLID RAW MATERIALS FROM A CONTAINER INTO A MIXER

(71) Applicant: BASF Coatings GmbH, Münster (DE)

(72) Inventors: Ralf Berg, Münster (DE); Frank Joege, Münster (DE); Jeremy Fouillet, Münster (DE); Bernhard Hueser, Münster (DE)

(73) Assignee: BASF COATINGS GMBH, Muenster (DE)

( * ) Notice: Subject to any disclaimer, the term of this patent is extended or adjusted under 35 U.S.C. 154(b) by 1104 days.

(21) Appl. No.: 17/772,250

(22) PCT Filed: Oct. 16, 2020

(86) PCT No.: PCT/EP2020/079151
§ 371 (c)(1),
(2) Date: Apr. 27, 2022

(87) PCT Pub. No.: WO2021/083688
PCT Pub. Date: May 6, 2021

(65) Prior Publication Data

US 2026/0116610 A1 Apr. 30, 2026

(30) Foreign Application Priority Data

Oct. 29, 2019 (EP) .................................... 19205853

(51) Int. Cl.
*B65B 69/00* (2006.01)
*B01F 35/71* (2022.01)

(52) U.S. Cl.
CPC .......... *B65B 69/0033* (2013.01); *B01F 35/71* (2022.01); *B65B 69/0008* (2013.01)

(58) Field of Classification Search
CPC .. B65B 69/0008; B65B 69/0033; B01F 35/71
See application file for complete search history.

(56) References Cited

U.S. PATENT DOCUMENTS

| | | | | | |
|---|---|---|---|---|---|
| 2,868,357 | A * | 1/1959 | Thomas | B65G 27/24 | 198/764 |
| 3,897,978 | A * | 8/1975 | Aoki | B65G 53/00 | 406/137 |
| 4,525,071 | A | 6/1985 | Horowitz et al. | | |
| 4,912,681 | A * | 3/1990 | Halsey | B01F 35/714 | 366/152.2 |
| 6,293,318 | B1 * | 9/2001 | Schmidt | B65B 69/0008 | 141/330 |
| 2002/0114672 | A1 * | 8/2002 | Isozaki | C21B 5/003 | 406/11 |
| 2009/0277039 | A1 * | 11/2009 | Rooksby | F26B 17/101 | 34/367 |
| 2013/0233359 | A1 * | 9/2013 | Meissner | B08B 3/02 | 134/134 |
| 2013/0258799 | A1 * | 10/2013 | Christy | B01F 35/71775 | 366/141 |
| 2016/0166998 | A1 * | 6/2016 | Sacchi | B01F 35/881 | 414/21 |
| 2020/0094206 | A1 | 3/2020 | Joege et al. | | |
| 2020/0179887 | A1 | 6/2020 | Joege et al. | | |

FOREIGN PATENT DOCUMENTS

| | | | | |
|---|---|---|---|---|
| CN | 2766946 | Y * | 3/2006 | |
| CN | 201634246 | U * | 11/2010 | |
| CN | 109692749 | A * | 4/2019 | B67B 3/20 |
| DE | 8910503 | U1 * | 1/1991 | |
| EP | 3244174 | A2 | 11/2017 | |
| JP | 5077571 | B2 * | 11/2012 | |
| KR | 101212307 | B1 * | 12/2012 | B65B 69/00 |
| WO | 2018210559 | A1 | 11/2018 | |
| WO | 2018210560 | A1 | 11/2018 | |
| WO | 2018210562 | A1 | 11/2018 | |

OTHER PUBLICATIONS

European Search Report for EP Patent Application No. 19205853.5, Issued on Apr. 17, 2020, 3 pages.
International Search Report and Written Opinion for corresponding PCT/EP2020/079151 mailed Dec. 22, 2022, 12 Pages.

* cited by examiner

*Primary Examiner* — Claire X Wang
*Assistant Examiner* — Patrick M McCarty
(74) *Attorney, Agent, or Firm* — Armstrong Teasdale LLP

(57) ABSTRACT

Disclosed herein is a unit for refilling and transferring solid raw materials as well as a method for refilling and transferring solid raw materials from original containers into a process mixer, using the unit.

13 Claims, No Drawings

DEVICE AND METHOD FOR REFILLING AND TRANSFERRING SOLID RAW MATERIALS FROM A CONTAINER INTO A MIXER

CROSS-REFERENCE TO RELATED APPLICATIONS

This application is a U.S. National Phase Application of International Patent Application No. PCT/EP2020/079151, filed Oct. 16, 2020, which claims priority to European Patent Application No. 19205853.5, filed Oct. 29, 2019, each of which is hereby incorporated by reference herein.

The present invention relates to a unit for refilling and transferring solid raw materials, comprising a refilling unit for refilling solid raw materials from original containers into a standardized loading unit, and a transferring unit for transferring the solid raw materials from a standardized loading unit into a process mixer. The present invention relates, moreover, to a method for refilling and transferring solid raw materials.

STATE OF THE ART

Formulations, being multicomponent systems of greater or lesser complexity, and their production are a central constituent of a wide variety of different branches of industry. Examples include the coatings industry, the food industry, and the medical industry. Corresponding formulations are produced by physical mixing of liquid (fluid) and solid substances (raw materials). Generally speaking, the solids needed for production (for example, pigments and fillers in the coatings industry) are converted in upstream steps into a liquid form (pastes, mill bases) and then used in the form of these intermediates in the actual production process.

The large range of products to be produced, in other words formulations, that exists in industrial production is frequently accompanied by a likewise massive complexity in terms of raw materials to be used. As a result of this, many products are produced only irregularly, in relatively small quantities, and as piece goods. The raw materials as well, consequently, are employed in large part as piece goods.

Solid raw materials are in that case introduced into the production operation generally directly from the original containers, in other words the packaging in which the raw materials are supplied. Within these bags the raw material is present generally in the form of bulk material (powder form). The original container is cut open by hand and the bulk material therein is then introduced into production, by being tipped into open bag heaps, hoppers or similar transfer vessels, for example.

The transfer vessel is then generally connected directly to the process mixer, by way of corresponding piping systems, for example. In the process mixer, the solid raw material is then brought into contact with further raw materials such as further solid raw materials and, in particular, fluid raw materials.

The procedure described, however, has a variety of disadvantages.

For instance, during the generally manual introduction of the solid raw material into the production operation, significant and difficult-to-control dusting and hence contamination of the working area, and also the potentially health-hazardous exposure of the staff, are unavoidable.

Moreover, during this manual filling operation, it is evidently necessary to take account of the size and/or weight of the original container. Depending on the formula of the formulation to be produced, original containers that have been broached must be stored pending possible further use, and for storage must be sealed and transported to a dedicated interim storage site-a costly and inconvenient procedure.

It is noteworthy, moreover, that because of safety considerations, central stores of raw materials, including solid raw materials, are required to meet certain provisions in order to be allowed to open raw material units that have been supplied (for example, a pallet which carries a defined number of original containers, bags for example, the latter being additionally packaged jointly by means of wrapping film, for example). In order to avoid the costly and inconvenient acquisition of such conditions in central stores, this may mean that raw material units of this kind must first be withdrawn from a store, transferred to a dedicated site (usually the production site) for the opening and withdrawal of a particular number of original containers, and the original containers then remaining must be again jointly packaged and transferred back into the central store. The administrative and logistical cost and complexity associated with this is massive.

The fact, not least, that the solid raw material is transferred from the transfer vessel via corresponding piping systems into a process mixer means that the atmosphere within the process mixer may also be transferred proportionally into the dispensing zone for the solid raw materials, and even, furthermore, into the zone of raw material stores. Since flammable liquid raw materials are frequently also used in the zone of production of formulations, and a flammable atmosphere may come about in the process mixer because of a certain vapor pressure of these raw materials, the refilling operation harbors the risk of the transfer of flammable vapors into the zone where the solid raw materials are introduced. Even if many or indeed the majority of solid raw materials for producing formulations are fundamentally not flammable and hence are unable to generate flammable dusts as well, an occasional dispensing of raw materials which can generate flammable dusts is statistically unavoidable. All in all, therefore, this means that, purely on a statistical basis, the risk exists in the dispensing zone that flammable hybrid mixtures (vapor and dust) come about. The necessities for avoiding ignition sources, which result from hybrid mixtures, are known to be difficult to assess and implement. Moreover, there may be a shift in explosion limits (in other words, the hybrid mixture may be explosive, despite the explosion limits of the individual components not being reached).

Problem and Technical Solution

It would be an advantage, and hence is a problem addressed with the present invention, therefore, to provide a unit for refilling and transferring solid raw materials, allowing corresponding refilling and transfer to take place without difficult-to-control dusting and corresponding health-hazardous exposure of staff, which also ensures that there can be no shifting of areas at risk from explosion. Furthermore, the refilling and transferring ought to be possible without giving rise to broached original containers of solid raw materials and corresponding interim stores. It would be advantageous, moreover, to be able to do without the mere broaching of supplied raw material units comprising a particular number of original containers, and the subsequent need for them to be put back into storage again.

A unit has been found for refilling and transferring solid raw materials, comprising (1) a refilling unit for refilling solid raw materials from original containers to a standardized loading unit (sL), the refilling unit comprising the following components:

(1.1) robotic unit comprising a robot which comprises a means (M1.1) for capturing original containers containing solid raw materials and moving the captured original containers, (1.2) container comprising a first, upper opening (oO1.2)) for receiving solid raw materials into the container a second, lower opening (uO1.2) for discharging solid raw materials from the container a cutting means (S1.2) disposed within the container, for cutting open original containers containing solid raw materials, the capturing and moving means of the robot (M1.1) comprising a covering means (A1.1), and the covering means (A1.1), the upper opening (oO1.2) and the cutting means (S1.2) being set up so that, in a position in which the original container captured with the means (M1.1) is shredded by the cutting means and the raw material contained falls into the container (1.2), the covering means (A1.1) lies form-fittingly on, and closes, the upper opening (oO1.2), (2) standardized loading units, each comprising a first opening (eO2) for receiving solid raw materials, a first reversible closure means (eV2) for the opening (eO2)

a second opening (zO2) for discharging solid raw materials, a second reversible closure means (zV2) for the opening (zO2) or an opening (ezO2) for receiving and for discharging solid raw materials, and a reversible closure means (ezV2) for the opening (ezO2), the container (1.2) of the refilling unit (1), and the standardized loading units (2), being set up so that they can be connected to one another reversibly via a connection (V) of the opening (uO1.2) with the opening (eO2) or with the opening (ezO2) and, in the connected state, solid raw materials can be transferred from the container (1.2) into the standardized loading units (2), and (3) a transferring unit for transferring solid raw materials from standardized loading units (2) into a process mixer, the transferring unit comprising the following components:

(3.1) means for docking standardized loading units (2) and for withdrawing defined quantities of solid raw materials present in standardized loading units (2), via the opening (zO2) or via the opening (ezO2) of the loading units (2), and (3.2) means for transferring the defined quantities as per (3.1) into a process mixer, the means (3.2) being associated with a device via which an active gas stream can be realized, which is aligned in a direction of the transfer of the defined quantities as per (3.1).

Also found, moreover, has been a method for refilling and transferring, using the unit of the invention for refilling and transferring solid raw materials.

DESCRIPTION OF THE INVENTION

The unit of the invention comprises a plurality of means and subunits, an example being a (sub)unit (1) and (3). According to the invention, the term "means" or "unit" or "subunit" describes the delimitable properties and individual functions of the respective means or units or subunits. It is not necessary, for example, for two units/means to be spatially or physically clearly separated from one another and/or for one means or one unit to constitute a spatially and/or physically individualized region in its own right.

The unit of the invention for refilling and transferring solid raw materials comprises to start with a (1) refilling unit for refilling solid raw materials from original containers into a standardized loading unit.

The term "solid", in connection for example with "solid raw materials", is to be understood in the context of the present invention in the sense of the generally customary meaning. Preferably, therefore, it means that under standard conditions (standard temperature and standard pressure) the substance in question is in the solid aggregate state, in other words in a—for example—crystalline, amorphous or polycrystalline state or in a hybrid of such states.

As already indicated above, original containers of solid raw materials are packaging items in which the raw materials are supplied. More particularly they are bags, examples being those of plastic and/or paper. These original containers are generally supplied in the form of larger raw material units comprising a defined number of original containers (for example, in the form of a pallet carrying a particular number of original containers). These larger raw material units then in each case also have a form of joint packaging for the individual original containers, such as a wrapping film, for example.

In the refilling unit (1), the solid raw material is transferred from the original container into a standardized loading unit (2). Further details of this loading unit (2) are found later on below.

The refilling unit (1) initially comprises a robotic unit (1.1) (that is, a unit which is able automatically to perform certain mechanical activities). It comprises a means (M1.1) for capturing original containers containing solid raw materials and also for moving such captured raw materials. Such means, as is known, are configured for example as at least a translatorially and rotatorially movable arm, which comprises at least one capture motor system which is automatically drivable, an example being a mechanical gripping mechanism or a vacuum gripper. The latter have proven appropriate in connection with the capture of bags filled with bulk material (since they allow capture to take place in a manner that does not destroy the container), and they are preferred accordingly. Of course, a robotic unit (1.1) or a means (M1.1) may also have both of the stated kinds of capture motor system, and/or a switching mechanism which enables the changeover/switching of the two different capture motor systems. In the context of the present invention, this is also a preferred variant.

The means (M1.1) of the robotic unit comprises a covering means (A1.1). A covering means of this kind is therefore evidently set up to cover openings. The means may comprise, for example, a plate, which in such a scenario is able to cover a corresponding planar opening.

A captured original container comprising solid raw material may be transferred into a container (1.2) via the means (M1.1). The container (1.2) comprises an upper, first opening (oO1.2) and also a lower, second opening (uO1.2). Ultimately, the container serves for dust-free transfer of the raw material as such (as bulk material) into a standardized loading unit (2) described as later on below. In this case the upper opening is intended to receive solid raw materials, and the lower opening is intended to discharge these solid raw materials again. For these purposes the container may have any desired shape, provided the aforementioned properties and functions are retained. Preferably, however, the container is configured in a hopper shape, where the upper opening is larger in relation to the lower opening, causing the container to taper downward as a result. In accordance with experience, a refilling operation can be optimally realized in this way.

The container (1.2) further comprises a cutting means (S1.2), which is disposed within the container and which is set up for cutting open original containers containing solid raw materials. The means in question is therefore preferably a blade via which the aforementioned bags can be cut open.

It is critical that the covering means (A1.1), the upper opening (oO1.2) and the cutting means (S1.2) are set up such that, in a position in which the original container captured with the means (A.1.1) is shredded by the cutting means, the covering means (A1.1) lies form-fittingly on, and closes, the upper opening (oO1.2). Corresponding geometric and construction-specific variables and arrangements to one another can be adapted by a person skilled in the art. It follows from the above in any case that in order to reach the described position, the means (M1.1) must be moved such that the captured original container first approaches the upper opening (oO1.2) and is then introduced through the opening (o1.2) into the container (1.2). In a position in which the cutting means cuts open the original container and therefore the solid raw material contained falls into the container (1.2), the covering means lies form-fittingly on the upper opening (oO1.2) and closes it. Preferably, therefore, the covering means is disposed in the immediate vicinity of the capture motor system of the means (M1.1) or is part of said motor system. It is conceivable in principle for the cutting means (S1.2) to be set up movably and, in the stated form-fitting positioning of the covering means, to be driven actively and automatically into the original container, thereby cutting it open. Preference, however, is given to the mechanically much simpler and more elegant solution of a fixed cutting means pointing in the direction of the opening (oO1.2). The means in that case is positioned such that an original container guided through the opening is placed onto the cutting means from above and is cut open. In the position in which effective cutting-open of the container is realized (in other words, the container has been cut open to the point that the raw material falls as bulk material into the container (1.2)), the form-fitting covering described is likewise realized. This ensures that the actually very dust-intensive opening and emptying operation on an original container of this kind can be carried out in the complete absence or at least the extremely low-level presence of dust.

Even if, for the reasons described, the dusting of solid raw materials is avoided or at least significantly reduced during the refilling operation, the refilling unit may comprise a suction withdrawal unit (1.3) via which any residual dusts which do arise can be drawn off under suction. Possible means that may be stated here are means such as an eddy current hood, an annular suction withdrawal system or a multipoint suction withdrawal system.

For the proper and effective disposal of the emptied original containers, there may also be a disposal unit (1b) associated with the refilling unit (1). In that case the original container, captured and emptied as before, can be moved by way of the robotic unit, via the means (M1.1), in the direction of the unit (1b) and then released (since, of course, the capture motor system is configured reversibly). The disposal unit may ultimately be of any desired configuration, and ultimately ensures proper disposal. In addition to a collecting container which is preferably present, to receive the emptied containers, there may be means for compacting the containers (empty bag compactors, for example) and means for conveying the containers or compacted containers (for example, screw conveyors, conveyor belts).

The unit of the invention further comprises standardized loading units (2).

Loading units (L) in a very general sense are to be understood to mean, according to the established definition, items of packaging for the accommodation of goods, such as boxes, drums, containers, and any further conceivable and available receptacles. Standardized loading units (2) are specific loading units which are configured and standardized—that is, made uniform—in line with their function.

One of the functions of the loading unit is the transfer of solid raw materials from the unit (1) into the unit (3). For the consequently necessary receiving and the necessary discharging of the raw materials, the loading unit (2) comprises either two openings (eO2) and (zO2), or else one opening (ezO2). In the latter case, therefore, the actual transfer of raw materials generally requires the turning of the loading unit (2), more particularly a turning of the loading unit (2) by 180°, this turning having to take place, in terms of time, between the receiving and the discharging. The reason is that the construction of the plant as a whole is of course preferably such that the unit from which raw materials are discharged is positioned, during discharge, above the receiving unit. Accordingly, the loading unit (2) is positioned beneath the unit (1) when raw materials are being received, and above the unit (3) when raw materials are being discharged.

Given that the loading unit (2) has a first opening (eO2) or an opening (ezO2) for receiving solid raw materials, which can be connected to the opening (uO1.2) of the container (1.2) by way of a connection (V), for solid raw materials to be transferred into the loading unit (2), it is inherently the case that the standardization must extend at least to this reversible connection (V).

Similarly, given that the transferring unit (3) described later on below comprises a means (3.1) for docking standardized loading units (2) and for withdrawing defined amounts of solid raw materials from a standardized loading unit (2) via the opening (zO2) or the opening (ezO2), it is the case that the standardization must likewise extend at least to the means for docking and for withdrawing of the loading units (2) that corresponds to the means (3.1).

Standardization of the loading units (2) is of course also possible in other ways. For instance, the loading units, independently of the connecting and docking described, may be standardized in terms of their capacity, the form geometry or the material.

The loading units (2) preferably have a receiving capacity (capacity) of 1 to 2 cubic meters. Typical materials for the loading units (2) are, for example, steels of grade 1.4301, 1.4541 or 1.4571, and also plastics such as, in particular, conductive polyethylene.

As already indicated above, the standardization extends to the reversible connection (V) of the opening (uO1.2) to the opening (eO2) or (ezO2), and also to the docking and withdrawal mechanism in relation to the means (3.1).

The means for connecting, docking, and also transferring and withdrawing are preferably automated in their configuration, meaning that the operations involved are carried out with incorporation of artificial control means, especially electronic control means.

The setup of such connections, docking mechanisms, and also transfer and withdrawal mechanisms may be selected individually by a person skilled in the art. There follows a brief explanation with reference to the description of the docking and the withdrawal via the means (3.1). In this connection there is also then a description of the means (3.1).

For the docking, it is possible for the loading units (2) to have standardized attachments for docking to the means (3.1). Correspondingly, the means (3.1) would in that case have docking devices serving as counterparts and/or connecting elements to the attachments on the loading units (2). If a loading unit (2) is brought up to a docking site of the means (3.1), it is preferably automatically centered and arrested or coupled. The standardized loading unit (2) in that case has a solids outlet which can of course be reversibly closed and opened, respectively. After the docking via the attachments, the solids outlet is aligned in such a way that a substance is able to flow from the loading unit (2) into the unit (3). There is, for example, a physical connection between the loading unit (2) and the means (3.1), which results at least from the attachments of the loading unit (2) and corresponding docking devices on the means (3.1). The connection which then exists between means (3.1) and the loading unit (2) via the opening (zO2) or (ezO2) is set up for the withdrawal of raw material. It is preferably possible via the coupling, moreover, via fundamentally known connecting elements, to ensure a supply to the loading unit (2) of general auxiliary energies (electricity, vapor and/or compressed air), in order thereby to ensure automated opening of the loading unit (2) (that is, of the opening (zO2) via the reversible closure means (zV2) or of the opening (ezO2) via the reversible closure means (ezV2)) for the purpose of generating a flow of substance, or else the driving of stirring devices or heating devices within the loading unit.

The means (3.1) then enable withdrawal of defined quantities of solid raw materials. For this purpose, the means (3.1) may comprise weighing units (for example, load cells), which are able to monitor the flow of materials and regulate and adapt it with incorporation of control means and regulating mechanisms.

The actual regulation of the mass flow may be accomplished via the vibration of a cone which is located in the loading unit (2), and/or via the driving of a screw which may be part of a loading unit or the means (3.1). Also possible is the use of disk valves or flap valves. A vibration unit, fluidizing unit or the like (if needed to promote solid flow properties) may also be present. The dosing accuracy of such systems is at least 2%, based on the addition value. It is also possible to limit the dosing rate, for example, to one kilogram per second. In such a case, therefore, the means (3.1) initially comprise the aforementioned means for determining a withdrawal quantity (especially load cells). Moreover, they comprise control means for the actual mechanisms for the withdrawal (that is, for example, the cones or screws or disk valves and/or flap valves disposed in the loading units (2)). In that case the control means would be configured in particular via an electronic control unit which takes account of the information ascertained by the load cells to drive the withdrawal mechanism and automatically regulates and adapts the withdrawal operation in line with the stipulations. The components to be optionally physically assigned to a loading unit (2) in such a case, such as a vibration cone, are in that case of course, in purely functional terms, to be assigned proportionally to the means (3.1) for withdrawal of defined quantities.

The above-described docking and withdrawal principles may evidently also be valid in connection with the refilling unit (1) and the connection (V) thereof to a standardized loading unit (2). Ultimately in such a case, in analogy to the transfer of "loading unit (2) into transferring unit (3)", the transfer of solid raw materials from the container (1.2) into a loading unit (2) takes place. Depending on the individual case and on individual circumstances, however, it is of course also possible to realize a transfer mechanism which deviates from this. Accordingly, in case of doubt, it is not always necessary or desirable to realize a technically complex transfer mechanism; instead, the container (1.2) serves merely for the dust-free transfer of the raw materials into a loading unit (2). The quantity of the raw material not filled into the loading unit (2) may then be ascertained by weighing means, without any need for an exact dosing mechanism always to be present.

A configuration of the connection (V) that is preferred in the context of the present invention (refilling unit (1)—loading unit (2)) and of the withdrawal mechanism of the means (3.1) via the opening (zO2) or (ezO2) of the loading unit (2) (loading unit (2) into transferring unit (3)) is described below.

Preference is given here to using what are called "split butterfly valves" (double flap dosing mechanisms). These, as is known, are mechanisms based fundamentally on the principle of flap valves (disk valves). Such flap valves at any rate comprise a valve disk which is able, where appropriate together with a gasket, to close an opening or a passage within a pipeline. The valve disk further comprises a means for rotation, a shaft for example, which enables rotation of the disk by up to 90°. In this way an opening or a passage can be opened and a flow of substance enabled. Via the degree of rotation of the disk it is possible to regulate the cross section of passage and hence the effective mass flow rate. Via a corresponding supply of auxiliary energies to the shaft, such as compressed air or electricity, and via incorporation of electronic control units, which may also communicate with corresponding weighing units, therefore, a specific flow of substance is also automatically establishable and also adaptable.

In the case of the double flap dosing mechanisms, a flap valve as described is combined with a further "passive disk". Both the active flap valve and the passive disk form, in the closed state, a reversible closure means in a container or a section of line. By connecting and/or coupling the two valve disks, the disks, which are then located parallel to one another, can be rotated jointly and uniformly via the drive-shaft of the active part. One advantage of such a system is that in the closed state the two valve disks are able to close two containers, even containers spatially separate from one another. Furthermore, however, after the coupling of the disks and corresponding rotation, a preferably regulatable and adaptable flow of substance is ensured, where the coupling of the disks may be embodied with such sealing that no material to be transferred, especially solid bulk material, is able to penetrate into the intermediate zone. Because the sides of the two disks that face the intermediate zone, after separation of the disks, represent the outer sides of the closure means then realized, the transfer of solid raw materials is therefore ensured without contamination.

For the first embodiment of the loading unit (2), namely the existence of a first opening (eO2) and a second opening (zO2), it is therefore preferable in the context of the present invention that

- the lower opening (uO1.2) of the container (1.2) has a reversible closure means which is configured as a valve disk,
- the first reversible closure means (eV2) of the loading units (2) is likewise configured as a valve disk, and the two valve disks are part of a double flap dosing mechanism.

More preferably the reversible closure means of the opening (uO1.2) constitutes the active part of the double flap dosing mechanism, and hence comprises the driveshaft. In this way the supply of auxiliary energies can be accomplished in a simpler construction, in order to ensure automated and regulatable refilling of a solid raw material from the container (1.2) into a loading unit (2).

It follows from what has been said above, moreover, that in the context of the first embodiment of the loading unit (2) (two openings) it is preferable that

- the second reversible closure means (zV2) of the loading units (2) is configured as a valve disk,
- the means (3.1) for docking and for withdrawing comprises an opening (O3.1) and also a reversible closure means (V3.1) for the opening (O3.1), and the closure means (V3.1) is likewise configured as a valve disk, and
- the two valve disks are part of a double flap dosing mechanism.

More preferably the reversible closure means (V3.1) of the opening (O3.1) constitutes the active part of the double flap dosing mechanism, and hence comprises the driveshaft. In this way the supply of auxiliary energies can be accomplished in a simpler construction, in order to ensure automated and regulatable transfer of a solid raw material from the loading unit (2) into the unit (3).

For the second embodiment of the loading unit (2), namely the existence of one opening (ezO2) it is therefore the case

- that it is preferred in the context of the present invention that
- the lower opening (uO1.2) of the container (1.2) has a reversible closure means which is configured as a valve disk,
- the reversible closure means (ezV2) of the loading units (2) is likewise configured as a valve disk, and
- the two valve disks can be combined as a double flap dosing mechanism.

More preferably the reversible closure means of the opening (uO1.2) constitutes the active part of the double flap dosing mechanism, and hence comprises the driveshaft. In this way the supply of auxiliary energies can be accomplished in a simpler construction, in order to ensure automated and regulatable refilling of a solid raw material from the container (1.2) into a loading unit (2).

It follows from what has been said above, moreover, that in the context of the second embodiment of the loading unit (2) (one opening) it is preferable that

- the means (3.1) for docking and for withdrawing comprises an opening (O3.1) and also a reversible closure means (V3.1) for the opening (O3.1), and the closure means (V3.1) is likewise configured as a valve disk, and
- the two valve disks, namely the valve disk (ezV2) and (V3.1), can be combined as a double flap dosing mechanism.

More preferably the reversible closure means (V3.1) of the opening (O3.1) constitutes the active part of the double flap dosing mechanism, and hence comprises the driveshaft. In this way the supply of auxiliary energies can be accomplished in a simpler construction, in order to ensure automated and regulatable transfer of a solid raw material from the loading unit (2) into the unit (3).

The use of loading units (2) described as earlier on above offers massive technical advantages. The reason is that the volume of a loading unit of this kind can be readily adapted to the anticipated or known sizes of original containers and also of supplied raw material units (such as a pallet). Moreover, the filling of a loading unit can be accomplished in temporal and spatial independence from a desired transfer of the raw material into a process mixer. Instead, after filling, a loading unit can be transferred into a unit for the holding of raw materials (i.e. an interim store) and then transported in line with requirements to a position for withdrawal and therefore transfer of the raw material into a process mixer. After the withdrawal, a still partly filled loading unit can be transported back into a holding unit.

One result of this is to prevent the incidence of broached original containers requiring interim storage prior to further use. Moreover, raw material units such as pallets can be transferred completely into loading units, thereby avoiding administrative and logistical effort and complexity in connection with safety considerations in central storage facilities.

Moreover, the fact that the raw materials are already present in such loading units allows the possibility of automated control and planning of production operations. As and when required, the raw material already withdrawn from the original container can be introduced into the process mixer, by corresponding automated transport of the loading unit and subsequent automated withdrawal of raw material, without any need for human intervention.

The unit of the invention comprises not least a transferring unit (3) for transferring solid raw materials from loading units (2) into a process mixer.

The unit (3) first comprises means (3.1) for docking of standardized loading units (2) and for withdrawal of defined amounts of solid raw materials, present in standardized loading units (2), via the opening (zO2) or (ezO2) of the loading units (2). These means (3.1) have already been described above.

Furthermore, the transferring unit (3) comprises means (3.2) for transferring the quantities withdrawn by means of (3.1) into a process mixer.

The configuration of the means (3.2) may differ according to individual circumstances and the spatial configuration of the production site. The means may comprise a vertical or largely vertical downpipe, which is connected via one end, for example, to the means (3.1) and via the other end to an opening of the process mixer, or the other end is disposed directly above this opening or projecting into the opening. The means (3.2) may also comprise an active conveying section (for example, vibration chute, screw, chain conveyor) via which the transfer can be realized. A possible example is a horizontal or very largely horizontal vibration chute (conveying chute) disposed in such a way that the quantities of solid raw material withdrawn via the means (3.1) are able to fall into a first region of the chute (where appropriate through a downpipe disposed between the means (3.1) and the chute) and can then be moved, by way of the vibration function, to one end of the chute. This end of the chute is then open on the end face and disposed directly above an opening of the process mixer. In this way the raw material is then transferred into the process mixer.

It is essential to the invention that the means (3.2) has associated with it a device via which an active gas stream can be realized, which is aligned in a direction of the transfer of the defined quantities as per (3.1). Where, for example, the means (3.2) is a vertical downpipe and where the solid raw materials then ultimately fall, driven by gravity, into the process mixer, the realizable gas stream is configured in the falling direction of the raw material. Where a horizontal chute is utilized, the gas stream can be oriented parallel to the chute and in the movement direction of the raw material.

Since the active gas stream is aligned in the transfer direction, it is therefore also aligned in the direction of the process mixer. Serving preferably as the gas for realizing the gas stream are air or else low-oxygen or oxygen-free gas mixtures such as nitrogen or noble gases. Preference is given to using air—fresh air, for example. The volume flow rate of the gas here is preferably greater than the volume flow rate of the dosed solid raw material, preferably greater than 1.5 times as large, more preferably greater than 2.0 times as large.

Since the active gas stream is aligned in the direction of the process mixer and generally also leads into the interior of the process mixer, an overpressure may come about in the process mixer. The reason is that the gas volume of the process mixer atmosphere that is displaced by the volume of solid is unable to escape, or to escape completely, owing to the gas of the gas stream that likewise is being forced into the process mixer. Through a correspondingly high volume flow rate of the gas stream, this gas may even penetrate additionally into the process mixer and again lead to an increase in pressure. Any such possible overpressure in the process mixer may be enabled to be dissipated by means of associated gas shuttle lines or an overpressure valve in the process mixer.

The gas stream and hence the means (3.2) offer a significant technical advantage.

In principle, indeed, it is unavoidably the case that the atmosphere in a process mixer, owing to a portion of organic solvents employed, comprises flammable vapors. The transfer of solid raw materials by way of any industrially realizable embodiment always means that a temporary spatial and hence also atmospheric connection is formed between the process mixer and the dosing system. The consequence is the risk of leakage of flammable vapors into the dosing system, and this leakage may successively lead into the region of the refilling of solid raw materials from original containers.

As already outlined at the beginning, reasons of pure statistics make it unavoidably the case that from time to time it is necessary to dispense raw materials which may give rise to flammable dusts. In the original refilling region, therefore, there is a risk of production of hybrid mixtures and hence the need for extremely costly and inconvenient prevention of ignition sources.

The means (3.2) and/or the gas stream described now prevent potential leakages of flammable gases in the dosing system. The reason is that the gas stream prevents the gas volume of the atmosphere of the process mixer, which is displaced by the dosed volume of solids, reaching the dosing system from the process mixer. In this way, on the one hand, hazardous hybrid mixtures are systematically ruled out, and so, on the other hand, it is possible to do without an expensive and complicated ignition source avoidance system that goes beyond the degree already set out in principle for solids.

For the sake of completeness, the term "process mixer" may additionally be explained. In the context of the present invention it refers to any receptacle which is or can be set up for the intermixing of substances.

The present invention also relates to a method for refilling and transferring solid raw materials from original containers into a process mixer, using the above-described unit of the invention for refilling and transferring solid raw materials. The principles, and also preferred embodiments, described above in the context of the unit of the invention are of course also valid in relation to the method of the invention.

In a first step (A) of the method, a solid raw material is refilled from an original container into a standardized loading unit. In this case, first (A1) an original container of a solid raw material is provided and then (A2) is transferred by means of the robotic unit (1.1) into the container (1.2). A direct consequence of what has been said above is that in the context of this transfer the means (M1.1) is employed; in other words, the means (1.1) captures the original container and moves this captured original container into the container (1.2). Then, in a third substep (A3), the solid raw material is introduced into the container (1.2), the original container being cut open by placement of the container onto the cutting means (S1.2), the raw material consequently falling into the container. In the substep (A4), then, the solid raw material is transferred from the container (1.2) into the standardized loading unit (2), and the raw material in this case is guided through the interconnected and opened openings (uO1.2) and (eO2) or (uO1.2) and (ezO2). Principles and also the preferred variant of such transfer, incorporating double flap dosing mechanisms, have been described above.

In the second stage (B) of the method of the invention, the solid raw material is transferred from the loading unit (2) into a process mixer. In this case, first of all (B1), the transferring unit (3) is connected to the loading unit (2) via the opening (zO2) or (ezO2), and then, automatically, a defined amount of solid raw material is withdrawn from the loading unit. At this point as well, reference may be made to the above observations in the context of the description of the unit of the invention, the principles of the automated transfer being set out in the explanation of the individual components and subunits. In the case of the embodiment of a loading unit with an opening (ezO2), the loading unit is preferably turned prior to withdrawal, more particularly turned preferably by 180°.

In a last substep (B3) of the stage (B), the solid raw material is transferred in a process mixer, and during the transfer a gas stream aligned in the direction of the transfer is realized. Again, in order to avoid repetition, reference is made to the above observations concerning the unit of the invention.

The invention claimed is:

1. A unit for refilling and transferring solid raw materials, comprising (1) a refilling unit for refilling solid raw materials from original containers to a standardized loading unit (sL), the refilling unit comprising the following components:

(1.1) a robotic unit comprising a robot which comprises a means (M1.1) for capturing original containers containing solid raw materials and moving the captured original containers, (1.2) a container comprising a first, upper opening (oO1.2) for receiving solid raw materials into the container, a second, lower opening (uO1.2) for discharging solid raw materials from the container, and a cutting means (S1.2) disposed within the container, for cutting open original containers containing solid raw materials, the capturing and moving means of the robot (M1.1) comprising a covering means (A1.1), and the covering means (A1.1), the upper opening (oO1.2) and the cutting means (S1.2) being set up so that, in a position in which the original container captured with the means (M1.1) is shredded by the cutting means and the raw material contained falls into the container (1.2), the covering means (A1.1) lies form-fittingly on, and closes, the upper opening (oO1.2), (2) standardized loading units, each standardized loading unit being a containing unit enclosing a predetermined volume and being configured to receive and hold solid raw materials within the predetermined volume thereof, each standardized loading unit comprising a first opening (eO2) for receiving solid raw materials, a first reversible closure means (eV2) for the opening (eO2), a second opening (zO2) for discharging solid raw materials, a second reversible closure means (zV2) for the opening (zO2), or an opening (ezO2) for receiving and for discharging solid raw materials, and a reversible closure means (ezV2) for the opening (ezO2), the container (1.2) of the refilling unit (1), and the standardized loading units (2), being set up so that they can be connected to one another reversibly via a connection (V) of the lower opening (uO1.2) with the opening (eO2) or with the opening (ezO2) and, in the connected state, solid raw materials can be transferred from the container (1.2) into the standardized loading units (2), and, in the unconnected state, the standardized loading units are configured to be transported away from said unit for storage of the solid raw materials remaining therein, and (3) a transferring unit for transferring solid raw materials from the standardized loading units (2) into a process mixer, the transferring unit comprising the following components:

(3.1) means for docking the standardized loading units (2) and for withdrawing defined quantities of solid raw materials present within the standardized loading units (2), via the opening (zO2) or via the opening (ezO2) of the loading units (2), and (3.2) means for transferring the defined quantities into the process mixer, the means (3.2) being associated with a device via which an active gas stream can be realized, which is aligned in a direction of the transfer of the defined quantities.

2. The unit as claimed in claim 1, wherein the means (M1.1) is configured as at least one translatorially and rotatorially movable arm which comprises at least one automatically driveable capturing motor system.

3. The unit as claimed in claim 1, wherein the cutting means (S1.2) is fixed, points in the direction of the upper opening (oO1.2) and is positioned in such a way that an original container guided through the upper opening (oO1.2) is placed from above onto the cutting means and is cut open.

4. The unit as claimed in claim 1, wherein the refilling unit (1) is additionally associated with a disposal unit (1b) which serves for disposing of emptied original containers.

5. The unit as claimed in claim 1, wherein the loading units (2) comprise the opening (ezO2) for receiving and for discharging solid raw materials, and the reversible closure means (ezV2) for the opening (ezO2).

6. The unit as claimed in claim 1, wherein the connection (V) (between refilling unit (1)—loading units (2)) and a withdrawal mechanism of the means (3.1) via the openings (zO2) or (ezO2) of the loading units (2) are configured as double flap dosing mechanisms.

7. The unit as claimed in claim 1, wherein the means (3.2) is configured as a vertically or largely vertically disposed downpipe.

8. The unit as claimed in claim 1, wherein the means (3.2) is configured as a horizontally or very largely horizontally disposed vibratory chute (conveying chute).

9. A method for refilling and transferring solid raw materials from original containers to a process mixer, using a unit as claimed in claim 1, comprising (A) refilling a solid raw material from an original container into at least one of the standardized loading units, comprising (A1) providing an original container containing a solid raw material, (A2) capturing the original container by means of the robotic unit (1.1) and transferring the captured original container into the container (1.2), (A3) filling the solid raw material into the container (1.2) by shredding the original container, by placing it onto the cutting means (S1.2), (A4) transferring the solid raw material into the enclosed volume of the standardized loading units (2) by the mutually connected and opened openings (uO1.2) and (eO2) or the mutually connected and opened openings (uO1.2) and (ezO2), and (B) transferring the solid raw material from the standardized loading units (2) into a process mixer, comprising (B1) connecting the transferring unit (3) to the standardized loading units (2) via the openings (zO2) or the openings (ezO2) of the standardized loading units (2), (B2) automatically withdrawing a defined quantity of solid raw material from within the standardized loading units (2), and (B3) transferring the raw material into the process mixer, where during the transfer a gas stream aligned in the direction of the transfer is realized.

10. The method as claimed in claim 9, wherein the volume flow rate of the gas stream is greater than the volume flow rate of the dosed solid raw material.

11. The method as claimed in claim 10, wherein the volume flow rate of the gas stream is greater than 1.5 times the volume flow rate of the dosed solid raw material.

12. The method as claimed in claim 9, wherein the standardized loading units (2) are turned prior to the transfer (B).

13. The method as claimed in claim 9, wherein the standardized loading units (2) are each turned by 180° prior to the transfer.

* * * * *